Feb. 27, 1923.
J. BOLF
ANIMAL POKE
Filed May 4, 1922
1,446,959
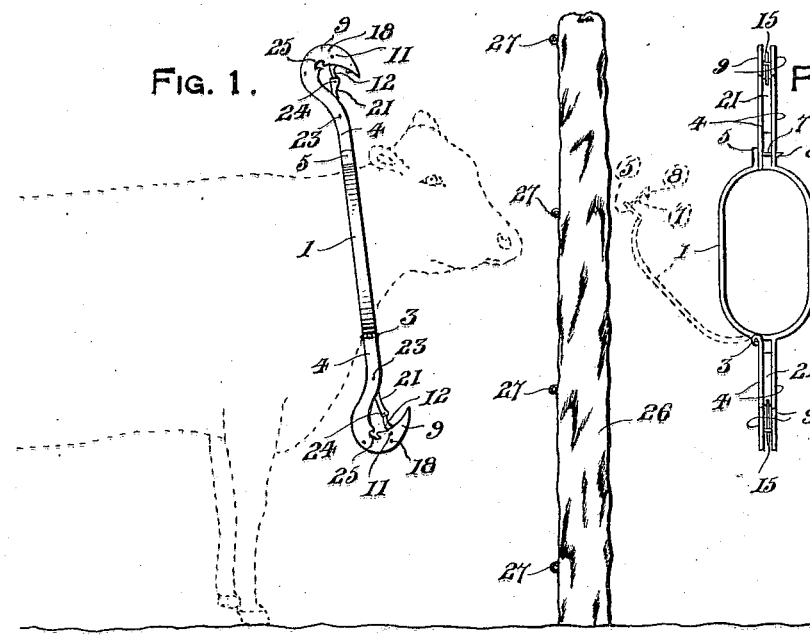

Patented Feb. 27, 1923.

1,446,959

UNITED STATES PATENT OFFICE.

JOHN BOLF, OF MILES, TEXAS.

ANIMAL POKE.

Application filed May 4, 1922. Serial No. 558,474.

*To all whom it may concern:*

Be it known that I, JOHN BOLF, a citizen of the United States of America, residing at Miles, in the county of Runnels and State of Texas, have invented certain new and useful Improvements in Animal Pokes, of which the following is a specification.

This invention relates to certain new and useful improvements in animal pokes or ox bows and has particular reference to the provision of bows or pokes to be placed upon the neck of an animal to prevent the animal from breaking through a wire fence or similar barricade.

The invention embodies in an animal poke of the above type, the provision of a collar to be placed upon the neck of the animal with catching devices arranged at the upper and lower ends of the collar for engagement with fence bars or other obstructions to prevent the animal breaking through the fence.

With these general objects in view and others that will appear as the nature of the invention is better understood, the same consists in the novel construction, combination and arrangement of parts hereinafter more fully described, illustrated in the accompanying drawing, and pointed out in the appended claim.

In the drawings forming a part of this application and in which like designating characters refer to corresponding parts throughout the several views:—

Figure 1 is a side elevational view of an animal yoke constructed in accordance with the present invention, the same being illustrated in position upon the neck of an animal as indicated by dotted lines, and also arranged adjacent a fence post, Figure 2 is a front elevational view of the poke showing the intermediate collar portion and the upper and lower hooks carried by the opposite ends of the collar, and further showing by dotted lines, one side of the collar moved to an open position, Figure 3 is a fragmentary longitudinal sectional view of one of the hook members illustrated by dotted lines in a closed wire engaging position, Figure 4 is an edge elevational view of the hook end shown in Figure 3, Figure 5 is a fragmentary detail sectional view showing the spring clip connection between the side sections of the collar, Figure 6 is a fragmentary side elevational view of that portion of the device shown in Figure 5, and Figure 7 is a fragmentary detail sectional view showing the hinge connection between the side sections of the collar.

Referring more in detail to the accompanying drawing, the animal poke embodies a collar section formed of curved opposite sides 1 and 2 hinged together as at 3, the side section 1 being movable relative to the opposite side section 2 with the free swinging end thereof detachably connected to the opposite side section. As shown in Figures 5 to 7, upper and lower spaced arms 4 project from the side section 2, the free end of the side section 1 carrying an extension 5 that is moved into flat engagement with the adjacent arm 4. The upper arms 4 are provided with aligned openings 6 into which a spring clip 7 is projected, the same being carried by the inner face of the extension 5, the hook 8 upon the end of the spring clip 7 engaging the side wall of the arm 4 adjacent the opening 6 of said arm, thereby detachably connecting the side sections 1 and 2 of the collar together.

The spaced bars 4 at the upper and lower ends of the collar are of identical construction, with similar retaining devices for the animal associated with each pair of spaced bars, the detail construction thereof being shown more clearly in Figure 3. The spaced side bars 4 are provided upon their outer ends with a curved hook shaped member 9, the side bars 4 outwardly of the collar 2 being spaced by rivets cooperating with the poke mechanism to be described. An angle arm 10 is pivotally mounted upon the rivet 11, and embodies leg extensions 12 and 13 defining a crotch 14, the leg 13 normally occupying a position as shown in Figures 1 and 3 between the ends of the spaced side bars 4. To maintain the angle arm 10 so positioned, a band spring 15 secured as at 17 to one of the connecting rivets, passes over the rivet 18 intermediate the ends of the spring, with the outer free end of the spring disposed beneath the connecting rivet 19. The lateral lug 20 projects from the outer side of the angle leg 13 and overlies the adjacent end of the spring 15, resiliency being given the spring by the rivets 18 and 19 cooperating therewith and normally retaining the angle arm in the position shown in Figure 3. The arm 21 is slidably mounted between the side bars 4, the same being provided upon the inner end thereof with an elongated slot 22 receiving a connecting rivet 23 as shown in Figure 3, while the outer end of the arm 21 is pivotally connected as at 24 to the adjacent free end of the leg 12 of the angle arm 10. The inner edges of the curved ends 9 of the side bars are provided with inwardly cut notched portions 25 that are normally closed by the adjacent leg 12 of the angle arm and the adjacent end 21 of the sliding arm.

Figure 1 of the drawing illustrates a fence post 26 supporting horizontal wires 27 which are engaged by the animal poke to prevent the animal wearing the same from breaking through the fence. In the operation of the device, the animal moves in proximity to the fence wire 27, and upon projecting its head between the wires, the latter are received in the crotch 14 of the angle arm 10, engaging the leg section 12 to shift the angle arm and sliding arm 21 against the tension of the spring 15 as shown in Figure 3 with the wire 27 finally received in the notches 25 of the end hooks 9, and when so disposed, the leg 13 of the angle arm closes the outer sides of the notches 25 and locks the poke to the fence wires. Backing movement of the animal will permit the spring 15 to restore the angle arm 10 to the full line position shown in Figure 3, at which time the poke will be readily disengaged from the fence wires.

While the form of the invention herein shown and described is what is believed to be the preferred embodiment thereof, it is nevertheless to be understood that various forms, modifications and arrangements of the parts may be made without departing from the spirit and scope of the invention as claimed.

Having thus fully described the invention, what I claim as new is:—

In an animal poke, a collar, hook shaped arms projecting from each end thereof and having notches in the inner sides of the arm hooks, an angle member emboding a pair of legs pivotally mounted between the adjacent arms, a spring associated with one of the legs of the angle member and a rod slidably mounted between the arms and pivotally connected to the angle member to be moved inwardly of the open side of the arm hooks to move the tensioned leg of the angle member to a position overlying the hook notches.

In testimony whereof I affix my signature.

JOHN BOLF.